United States Patent Office 3,344,099
Patented Sept. 26, 1967

3,344,099
GASKET-FORMING NON-SETTLING SOLVENT-BASED RUBBER COMPOSITIONS CONTAINING LECITHIN
Gerald F. Cahill, Belmont, and Irving J. Arons, West Peabody, Mass., assignors to W. R. Grace & Co., Cambridge, Mass., a corporation of Connecticut
No Drawing. Filed Dec. 21, 1964, Ser. No. 420,125
10 Claims. (Cl. 260—23.7)

Compositions containing natural or synthetic rubber dispersed or dissolved in a volatile organic solvent have found widespread use in the manufacture of coatings, films, dipped goods, molded goods and various other articles. Such compositions have also found utility in the manufacture of "flowed-in" gaskets for container closures. In preparing these gaskets, a band of the fluid material is deposited through a nozzle into the annular sealing area of the closure. Thereafter, the deposit is converted into a solid sealing mass by drying and curing at elevated temperatures.

Among the solvent-based compositions most widely used in the preparation of closure gaskets are solvent solutions of 2-chloro-1,3-butadiene polymers. Besides the solvent and elastomer, these compositions contain certain other compounding ingredients including a curing agent and relatively large quantities of filler. By utilizing fillers in fairly substantial amounts, it is possible to improve the processing characteristics of the composition and to obtain gaskets having certain desired properties. For example, fillers are used to modify the specific gravity and the flow characteristics of the fluid composition. Also, fillers are used to impart toughness and hardness to the finished product, to increase abrasion and tear resistance, and to increase resistance to deterioration caused by oxidation, moisture, solvents and certain chemicals.

While these solutions, after drying and curing, provide gaskets exhibiting excellent sealing performance, the compositions have suffered from certain drawbacks. Mainly, it has been difficult to prevent some of the filler and other particulate material which may be present from settling out of the composition between the time of its manufacture and use. Even when zinc resinate has been added as a wetting agent for the filler it has been found that over storage times of a month or so a significant amount of sediment forms in the bottom of the drums conventionally used to package the composition. Though attempts have been made to redisperse the sediment by stirring the composition for relatively long periods prior to lining, this procedure has met with little success. Most of the settled material is non-redispersible and remains as a hard-packed, gritty mass which frequently causes interruptions in the lining operation due to clogging of the nozzle used to apply the composition to the closure.

In further attempts to alleviate this problem, the composition has been passed through a screen before stirring and lining. Though much of the sediment may be removed in this manner, the procedure has proved inconvenient and time-consuming since the screen becomes rapidly clogged and must be changed for each drum of material processed. As a result, the user often finds it expedient to decant or siphon off the homogeneous portion of the composition and then discard the sludge remaining in the bottom of the drum despite the loss of material.

It is, therefore, the main object of the present invention to provide solvent rubber solutions which exhibit improved resistance to sediment formation even when fillers are added in very substantial amounts. This object is accomplished by substituting lecithin on an equal weight basis for the zinc resinate or other compound ordinarily used as the wetting agent for the fillers present in the composition. More particularly, the present invention provides a gasket-forming composition comprising an elastomeric polymer dissolved in a volatile organic solvent, a curing agent, an inorganic filler and a minor amount of lecithin.

In carrying out the present invention, the lecithin used may be any of the phosphatidylcholines of animal or plant origin. Among suitable lecithins are those derived from egg yolk, corn, peanut, cottonseed, and soybean. While the lecithin may be employed in essentially pure form, it is frequently more convenient and economical to use a commercial or technical grade lecithin, such as, natural soya lecithin which contains about two-thirds phosphatide and one-third glyceride oil. The amount of lecithin used ranges between about 1.5 and 2.0 parts by weight per 100 parts by weight of filler. At least about 1.5 parts is necessary to prevent settling of the filler while above about 2.0 parts no appreciable benefit with respect to anti-settling properties is obtained.

In preparing the compositions of the present invention, any elastomeric polymer may be used including natural rubber, copolymers of butadiene and styrene, and terpolymers of butadiene, styrene and acrylonitrile. However, it is preferred to use polymers of 2-chloro-1,3-butadiene because of the greater resistance of these polymers to deterioration by heat, light, animal and vegetable oils, solvents, and many other chemicals. These polymers are commonly referred to as neoprenes as is well-known in the art and comprise homopolymers of chlorobutadiene and copolymers of chlorobutadiene with minor amounts of styrene, acrylonitrile, isoprene or other copolymerizable comonomer. Of the neoprenes commercially available, any of the general purpose types, such as GN, GNA, W, and WRT may be used and also special purpose types, such as KNR, CG and AC may be used in admixture with the general purpose types.

The elastomer may be dissolved in a volatile organic liquid which is a solvent for the polymer or the elastomer may be dissolved in a mixture of organic liquids which together function as a solvent for the polymer. Also, mixtures of solvents may be employed as well as mixtures of a solvent with a diluent. Suitable solvents for the neoprene include benzene, toluene, xylene, ethyl acetate, methyl ethyl ketone, mixtures of toluene and hexane or gasoline, and mixtures of high boiling aromatic and aliphatic petroleum solvents, e.g. "Solvesso 100" and "Varsol #1." Preferably, the solvents employed for neoprene are toluene and mixtures of toluene with a diluent e.g., petroleum naphtha, because such solvents may be readily volatilized from the compositions at the drying temperatures conventionally employed.

The fillers employed may be any of those conventionally used in the rubber compounding art, such as, carbon blacks, barytes, talc, asbestine, hydrated calcium silicate, precipitated silicon dioxide and whiting. In preparing filled neoprene compositions, clays have been especially suitable since they impart a comparatively greater degree of strength and hardness to the cured composition.

The selection of the curing agent will depend upon the particular elastomer employed. Among the curing agents which may be used for sulfur curing elastomers are elemental sulfur, selenium, tellurium and sulfur-containing compounds, e.g. alkyl thiuram sulfides and alkyl dithiocarbamates. For non-sulfur curing elastomers, peroxides, quinone dioxime and metallic oxides may be used. In curing neoprenes, it is preferred to use a mixture of zinc oxide with light or extra light calcined magnesium oxide because of the rapid cures which may be obtained without scorching.

Other ingredients which may be incorporated into the composition are lubricants, e.g. stearic acid and petroleum waxes; plasticizers, e.g., dioctyl phthalate and dioctyl sebacate; and antioxidants, e.g. diphenyl-p-phenylenediamine and p(p'-tolylsulfonyl-amido) diphenylamine.

The amounts of the ingredients employed may vary widely. For example, the filler may be used in quantities ranging between about 80 and 300 and preferably between about 80 and 200 parts by weight per 100 parts by weight of elastomer. About 80 parts of filler are needed for obtaining products, especially gaskets of the requisite hardness. Above about 300 parts, the gasket tends to become too hard and lacks the resilience and elasticity desired for sealing purposes. The solvent is used in an amount that will give compositions having a total solids concentration between about 50 and 65 percent by weight. Below about 50 percent by weight, it is difficult to obtain gaskets of the desired thickness at one pass through the lining machinery while above about 65 percent by weight, the composition becomes difficult to line on conventional equipment. The total solids is based on the quantity of elastomer, filler, curing agent and other substantially nonvolatile ingredients used. The curing agent is added in an amount that will effect a rapid and complete cure in the temperature ranges employed. When plasticizers, antioxidants, lubricants and other compounding ingredients are incorporated into the composition, they are used in conventional amounts to achieve the desired effects.

The following example is given to further illustrate the present invention. All quantities given are in parts by weight unless otherwise specified.

*Example*

| Ingredients: | Parts by weight |
|---|---|
| Poly 2-chloro-1,3-butadiene | 100 |
| Sodium acetate (processing aid) | 1.5 |
| Paraffin wax—melting pt. 117° F. (lubricant) | 2.0 |
| Buca clay (filler) | 99.8 |
| Dioctyl phthalate (plasticizer) | 48.7 |
| Light calcined magnesium oxide (curing agent) | 4.0 |
| Zinc oxide (curing agent) | 5.0 |
| Tetraethyl thiuram disulfide (peptizer) | 2.5 |
| Piperidinium pentamethylene dithiocarbamate (peptizer) | 2.0 |
| Precipitated silicon dioxide (bodying agent) | 0.1 |
| Wetting agent. | |

Two masterbatches (A) and (B) containing the ingredients listed above were prepared according to the following procedure. The batches were identical except that two different wetting agents were used.

In batch (A) zinc resinate ("Zinar Resin") was used in an amount of about 2 parts by weight.

In batch (B) commercial soybean lecithin ("Yelkin TT-S") was used in an amount of about 2.8 parts by weight. The commercial material employed contained about 65% by weight lecithin so that the actual amount of lecithin present in the composition was about 1.8 parts by weight.

In preparing the batches, the polymer, paraffin wax, sodium acetate and about 80 parts of the clay were masticated in a Banbury mixer. A blend containing the magnesium oxide, a portion of the plasticizer and a portion of the wetting agent were then added to the rubber mix. After a homogeneous mixture was obtained, the batch was transferred to a Werner-Pfleiderer mixer. Another blend containing the silicon dioxide, zinc oxide, a small portion of plasticizer and the remaining wetting agent was then added along with the peptizers, and the remaining clay and plasticizer. The batch was then mixed until a homogeneous blend was obtained.

Each batch was solvated in a mixture consisting of 3 parts by weight toluene and 1 part by weight petroleum naphtha. The total solids concentration of each batch was adjusted to a total solids concentration of about 57% by weight.

Five samples of batch (A) and five samples of batch (B) were packaged and allowed to stand for one week. At the end of that time, the amount of sediment was measured and an average taken for each group of five samples.

It was found that the sediment which had accumulated in the composition prepared from batch (A) was about 1% by weight based on the total solids concentration while the sediment accumulated in the composition prepared from batch (B) was only about 0.1% by weight. In addition to about a ten-fold reduction in settling, it was found that the sediment in composition (B) was finely divided and readily redispersible with simple stirring while the sediment formed in composition (A) was a gritty, hard-packed mass which was essentially non-redispersible.

From the results obtained, it is apparent that the use of lecithin as a wetting agent in elastomeric solutions containing large amounts of fillers provides a significant reduction in settling of the particulate material. Also, the small amount of material that may settle out on standing can be easily redispersed into the solution. Thus, there is no need to screen the composition in order to prevent clogging of the lining machinery and further, waste is eliminated since the composition is one-hundred percent usable.

We claim:

1. A gasket-forming composition consisting essentially of 100 parts by weight of a peptized elastomreic polymer of 2-chloro-1,3-butadiene dissolved in a volatile organic solvent, a curing agent for said polymer, between 80 and 300 parts by weight of an inorganic filler, and between about 1.5 and 2.0 parts by weight of lecithin per 100 parts by weight of filler, the total solids concentration of said composition ranging between about 50 and 65% by weight.

2. A composition according to claim 1 wherein the filler is used in an amount between about 80 and 200 parts by weight per 100 parts by weight of elastomer.

3. A composition according to claim 1 wherein the filler is clay and the curing agent is a mixture of zinc oxide and magnesium oxide.

4. A composition according to claim 1 wherein the solvent is toluene.

5. A composition according to claim 3 wherein the solvent is a mixture of toluene and a diluent.

6. A composition according to claim 5 wherein the diluent is petroleum naphtha.

7. A gasket-forming composition consisting essentially of 100 parts by weight of a peptized elastomeric polymer of 2-chloro-1,3-butadiene dissolved in a volatile organic solvent, about 100 parts by weight clay, about 10 parts by weight of a mixture of zinc oxide and magnesium oxide and between about 1.5 and 2.0 parts by weight of lecithin, the total solids concentration of said composition being between about 50 and 65 percent by weight.

8. A composition according to claim 7 wherein the solvent is toluene.

9. A composition according to claim 7 wherein the solvent is a mixture of toluene and a diluent.

10. A composition according to claim 9 wherein the diluent is petroleum naphtha.

(References on following page)

References Cited

UNITED STATES PATENTS

| | | | |
|---|---|---|---|
| 2,067,234 | 1/1937 | Gordon | 260—41 |
| 2,201,064 | 5/1940 | Thurwen | 260—30.6 |
| 2,373,461 | 4/1945 | Crampton | 260—41.5 |
| 2,428,771 | 10/1947 | Almy | 260—41.5 |
| 2,874,863 | 2/1959 | Unger | 260 |
| 3,244,663 | 4/1966 | Morrisville | 260—41.5 |

FOREIGN PATENTS 724,366    1/1932    France.

OTHER REFERENCES

Latex and Rubber Derivative and Their Industrial Application, vol. 2, Marchionna, 1937, pp. 198, 199 and 364. Condensed Chemical Dictionary, 6th Edition, Rose, Reinhold Pub., 1961, p. 662.

JULIUS FROME, *Primary Examiner.*